(Model.)

A. NICOUD.
Button and Stud.

No. 229,169.  Patented June 22, 1880.

Witnesses  Inventor
John Becker  Arnold Nicoud
Fred Haynes  by his Attorneys
  Brown & Brown

UNITED STATES PATENT OFFICE.

ARNOLD NICOUD, OF NEW YORK, N. Y.

BUTTON AND STUD.

SPECIFICATION forming part of Letters Patent No. 229,169, dated June 22, 1880.

Application filed March 29, 1880. (Model.)

*To all whom it may concern:*

Be it known that I, ARNOLD NICOUD, of the city, county, and State of New York, have invented a new and useful Improvement in Buttons and Studs, of which the following is a description, reference being had to the accompanying drawings.

This invention consists in an improved button or stud having a disk or face consisting of a substantially plain polished surface, but having certain portions slightly removed or cut away to produce plain, waved, or check shade-lines, giving the appearance of elevations and depressions, as hereinafter described.

Figure 1:
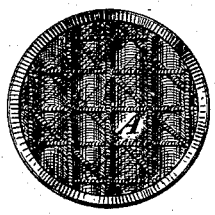
Figure 2:
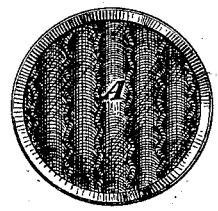

In the accompanying drawings, Figures 1 and 2 are face views of two sleeve-buttons illustrating my invention, one having the apparent elevations and depressions on its disk or face produced in waved shade-lines and the other having them produced in check-lines.

The cutting away by which the shade-lines are produced may be performed on the plain polished surface of the metal from which the disks A are to be made before the said disks are cut from the said plates, or it may be produced on the disks after they have been cut out.

The cutting away might be performed by hand; but it is preferable to do it by machinery. The machine which I prefer to employ and am now using with success is composed of two principal parts, in one of which the grinding-tool is chucked and in the other of which the work is chucked. The part first mentioned resembles an ordinary drilling-lathe with a rotary chuck like a drill-chuck. The tool which is placed in this chuck consists of a stick of hard wood or ivory or other material softer than the gold or other metal to be operated upon, and its grinding quality is given to it by applying to its point or end a quantity of emery or other powder of similar character. The other part of the machine consists of a chuck-carriage, which is arranged facing the tool-chuck, and which contains the chuck for receiving the plate or disk to be operated upon. The carriage is composed in part of slides, which are capable of movements of various kinds in planes perpendicular to the axis of the tool-chuck, so that the plate may be moved across and in contact with the point of the tool in various directions, according to the lines or figures of the pattern to be produced, and the chuck is fitted to said carriage in such a manner as to be capable of being adjusted about an axis in line or parallel with the axis of the tool.

The drill-chuck should have an extremely rapid rotary motion while the tool is being moved across and in contact with its point.

The cutting away may be varied by the use of tools with broader or more or less sharp points, and by the character and direction of the movement given to the chuck which holds the plate or disk.

The cutting away thus produced has a conspicuously distinctive character of its own, and jewelry thus ornamented can be distinguished from all other kinds.

By the term "disk" I do not intend to confine myself to a circular form, as it is obvious that the forms of the faces of such articles of jewelry as are herein embraced may be of various profile forms.

What I claim as my invention is—

An improved button or stud having a face consisting of a substantially plain polished surface, but having certain portions slightly removed or cut away to produce plain, waved, or check shade-lines, giving the appearance of elevations and depressions, as herein specified.

ARNOLD NICOUD.

Witnesses:
H. HOWARD,
E. P. JESSUP.